United States Patent [19]

Fuerst

[11] Patent Number: 4,911,496
[45] Date of Patent: Mar. 27, 1990

[54] VEHICLE ROOF WITH FRONT AND REAR COVERS

[75] Inventor: Arpad Fuerst, Germering, Fed. Rep. of Germany

[73] Assignee: Webasto AG Fahrzeugtechnik, Gauting, Fed. Rep. of Germany

[21] Appl. No.: 235,679

[22] Filed: Aug. 20, 1988

[30] Foreign Application Priority Data

Sep. 8, 1987 [DE] Fed. Rep. of Germany ....... 3730112

[51] Int. Cl.⁴ ............................................. B60J 7/047
[52] U.S. Cl. ................................... 296/220; 296/214; 296/222
[58] Field of Search ............... 296/214, 216, 217, 220, 296/222

[56] References Cited

U.S. PATENT DOCUMENTS

| | | | |
|---|---|---|---|
| 3,075,807 | 1/1963 | Werner | 296/216 X |
| 4,223,942 | 9/1980 | DeLuca | 296/222 |
| 4,257,646 | 3/1981 | Schatzler | 296/222 |
| 4,498,701 | 2/1985 | Queveau | 296/216 |
| 4,659,140 | 4/1987 | Fuerst et al. | 296/223 |

FOREIGN PATENT DOCUMENTS

| | | |
|---|---|---|
| 1162212 | 1/1964 | Fed. Rep. of Germany . |
| 1946161 | 9/1978 | Fed. Rep. of Germany . |
| 8119662 | 9/1981 | Fed. Rep. of Germany . |
| 3149977 | 6/1983 | Fed. Rep. of Germany ...... 296/220 |
| 3307198 | 9/1983 | Fed. Rep. of Germany . |
| 3338372 | 4/1984 | Fed. Rep. of Germany ...... 296/211 |
| 3545869 | 10/1986 | Fed. Rep. of Germany . |
| 3532111 | 3/1987 | Fed. Rep. of Germany . |
| 3545871 | 6/1987 | Fed. Rep. of Germany . |
| 3640168 | 6/1987 | Fed. Rep. of Germany ...... 296/216 |
| 3801881 | 8/1988 | Fed. Rep. of Germany ...... 296/220 |
| 573355 | 11/1945 | United Kingdom ................ 296/220 |

Primary Examiner—Dennis H. Pedder
Attorney, Agent, or Firm—Sixbey, Friedman, Leedom & Ferguson

[57] ABSTRACT

Vehicle roof having a front cover and a rear cover adjoining each other in the longitudinal direction of the vehicle which, in a closed position, close a roof aperture in a fixed roof surface.

Due to the effects of pure translational movement, the front cover is rearwardly displaceable into an open position, while the rear cover can be moved into a position permitting a sliding back of the front cover thereover. In accordance with the invention, the rear cover can be pivoted around an axis near its rear edge into a venting position, in which the front edge of the rear cover is lowered, relative to the rear edge of the front cover (FIG. 3).

20 Claims, 5 Drawing Sheets

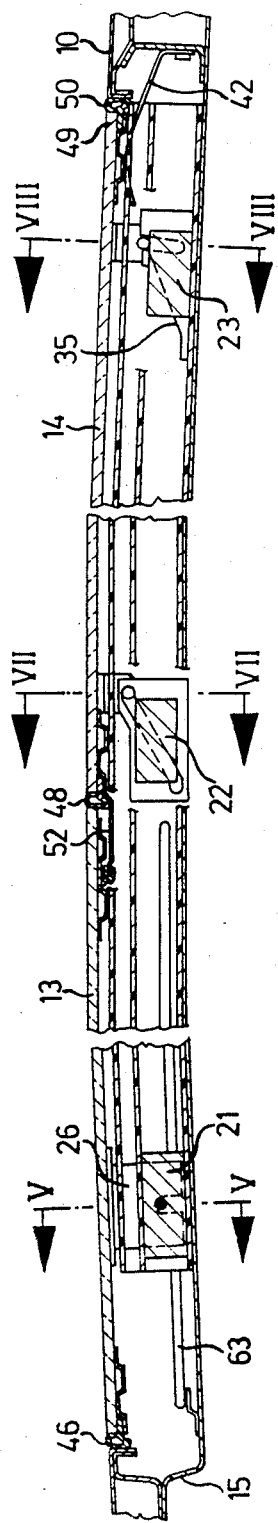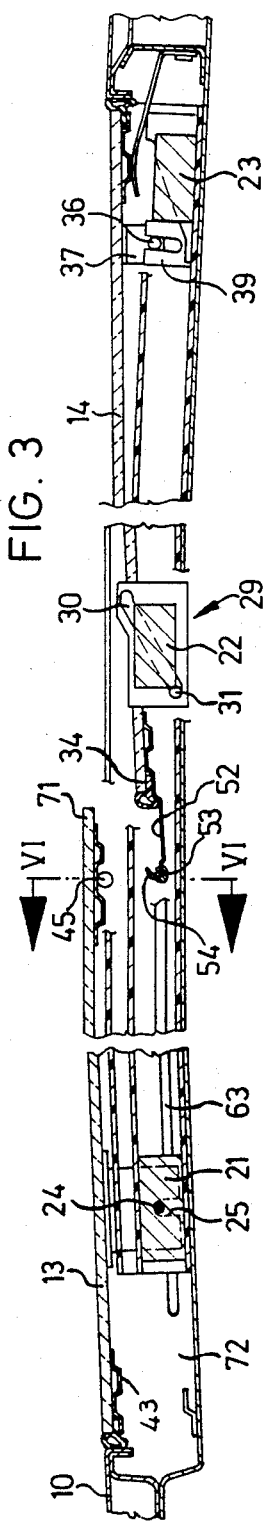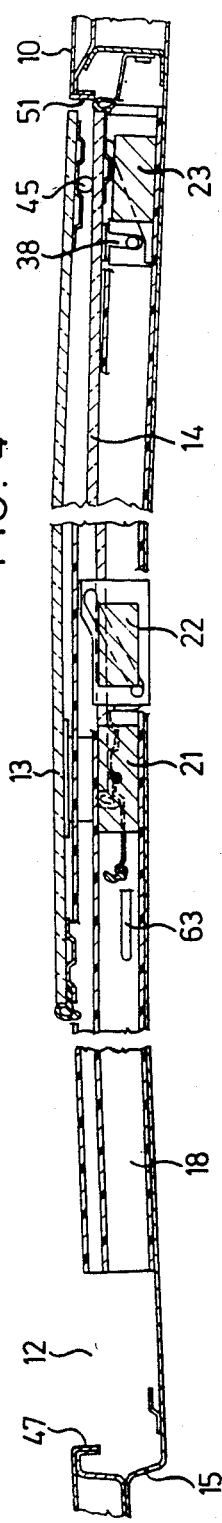

VEHICLE ROOF WITH FRONT AND REAR COVERS

BACKGROUND OF THE INVENTION

The invention relates to a vehicle roof having a front cover and a rear cover adjoining each other in the longitudinal direction of the vehicle, and which, in the closed position, cover an aperture in a fixed roof surface; whereby the front cover, as a consequence of a translational movement to the rear, is displaceable into an open position, and the rear cover can be moved into a position permitting retraction of the front cover.

Vehicle roofs of this kind have been known in varying forms of design. One design (German Auslegeschrift 11 62 212 and German Offenlegungsschrift and corresponding U.S. Pat. Nos. 3,075,807 and 4,498,701; and as the rear cover disposed such that it is displaceable upwardly above the fixed roof surface in an essentially parallel manner when the front cover is slid back, with the front cover being accommodated beneath the rear cover. Such an arrangement causes increased air resistance and considerable wind noise at high speeds. Moreover, such roofs do not provide a venting position in which the cover closes the roof aperture but leaves a ventilation gap which lies in an essentially vertical plane.

Another known design of the kind mentioned above (German Patent No. 19 46 161), not only permits displacement of the front cover in a longitudinal direction of the vehicle, but additionally can be upwardly extended at its rearward en into a venting position above the fixed roof surface. In order to create space for a displacement of the front cover to the rear, the rear cover is lowered parallel to the fixed roof surface, and subsequently is slid rearwardly below the fixed roof surface. Such a design has the disadvantage that it considerably reduces the size of the aperture which can be exposed in the longitudinal direction of the vehicle in the open roof position, as the fixed roof surface has to extend rearward of the roof aperture by an amount which at least equals the length of the rear cover. Another disadvantage is that extension of the front cover into the venting position causes the amount of air resistance to be undesirably increased.

German Gebrauchsmuster 81 19 662 discloses a vehicle roof which provides a roof opening in the rear roof area, in which a cover, suitable for closing this roof opening, can be lowered with its front edge below the front edge of the roof opening. However, in this vehicle roof, which has a single cover, the only way to expose the roof opening is through a cumbersome procedure of removing the cover entirely and stowing it away in the interior of the vehicle.

SUMMARY OF THE INVENTION

It is the primary objective of the present invention to provide a vehicle roof of the kind mentioned above which, in a relatively simple manner, in addition to an open position, affords a venting position in which there is no significant increase in air resistance.

This objective is achieved by a preferred embodiment of the invention in that the rear cover can be pivoted into a venting position about an axis located near its rear edge, in which position the front edge of the rear cover is lowered, relative to the rear edge of the front cover, and does not cause any significant change in air resistance, even at high speeds.

Advantageously, the rear cover can additionally b lowered in its entirety into a position enabling the front cover to slide thereover. This in turn enables an especially large aperture to be exposed in the open position of the roof. Appropriately, for the purpose of the pivoting movement of the rear cover, retaining bracket members are provided at its front area which act upon both sides; such members having a retaining bracket pin connected with the rear cover, and a slider displaceably running on a lateral guide rail, which has a slot for receiving such bracket pin. Along the guide rails, there are displaceable sliders coupled to be taken along with the front cover. In this manner a particularly simple actuating mechanism is achieved.

For displacement of the rear cover in vertical direction, each another slider is provided at both sides of the cover, which slider has a guide track that cooperates with a guide pin. In the rear portion of the front cover, a bearing element can be provided which engages the rear cover when the front cover is retracted, pushing it downwardly against the effects of a bias spring.

A common primary drive in the form of a manual or electric motor, with a distributor gear downstream thereof, is provided for displacement of the front and rear covers. Furthermore, the front cover is preferably bilaterally slidably guided in a channel, coordinated, respectively, to one of the guide rails at the side edges of the appropriate cover and against which the edge portion of the rear cover also abuts in its closed position. This arrangement affords an uncomplicated, and simultaneously, secure guidance of the cover.

It is an advantage that the vehicle roof, in accordance with the invention, requires only low height of construction. It can be designed as a completely pre-mounted installation unit to be installed into the fixed roof of the vehicle. Moreover, the vehicle roof is also suitable as a component of a retrofit roof with integrated venting equipment, as disclosed in German Offenlegungsschrift 35 45 871.

These and further objects, features and advantages of the present invention will become more obvious from the following description when taken in connection with the accompanying drawings which show, for purposes of illustration only a single embodiment in accordance with the present invention.

BRIEF DESCRIPTION OF THE DRAWINGS

FIGS. 2, 3 and 4 are longitudinal sectional views through the vehicle roof in its closed, venting, and open positions, respectively;

DETAILED DESCRIPTION OF THE PREFERRED EMBODIMENT

Figure 1:
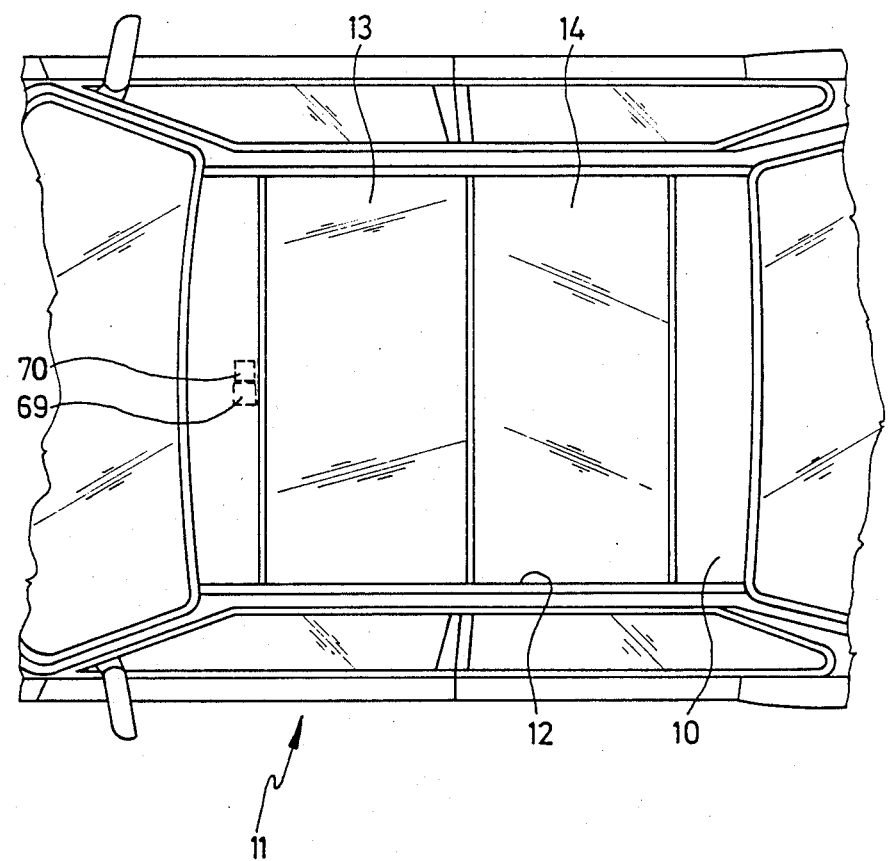
FIG. 1 is partial top view of a vehicle, equipped with a vehicle roof in accordance with the invention.

As can be seen, particularly in FIGS. 1–4, a roof aperture 12 is provided in a fixed roof surface 10 of vehicle 11. Aperture 12 extends laterally over the entire width and longitudinally over most of the length of the roof. Roof aperture 12, selectively, can be closed or partially exposed by way of a front cover 13 and a rear cover 14. Covers 13, 14 may be made of sheet metal, or of a transparent or translucent material like glass or plastic. The example depicted has a glass cover. Roof aperture 12 is encircled by a roof frame 15 that is disposed under the fixed roof surface 10, and which forms a water gutter 16. On both lateral sides of roof aperture 12, roof frame 15 has a lower guide rail 18 located at a shoulder 17, laterally outwardly adjoining gutter 16. Guide rail 18, preferably, has a uniform cross section over its entire length and, accordingly, may be designed as an extrusion-molded part. Guide rails 18 extend in the longitudinal direction of the vehicle, parallel to side edge 19 of roof aperture 12. The guide rails 18 and the other components of the roof are arranged in mirror-image symmetry relative to the central longitudinal axis of the roof. Consequently, a detailed description of the design and function of the arrangement is restricted to only one side thereof.

Figure 5:
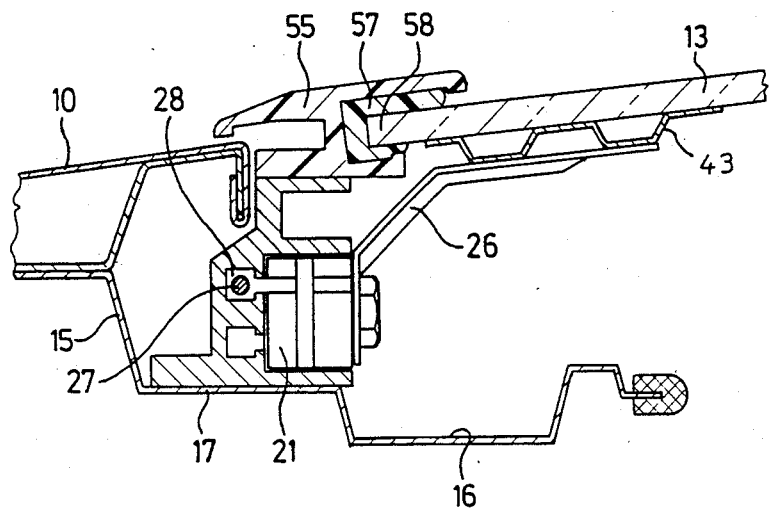
FIG. 5 is a sectional view taken along line V—V of FIG. 2.

In guide channel 20 of guide rail 18, which is laterally inwardly open, there are three sliders 21, 22, 23 which are slidably movable in the longitudinal direction of the guide rail. Front slider 21 is coupled with the front cover 13 so as to cause the front cover 13 to follow along with slider 21. The drive coupling has a pin 24 that is affixed to front slider 21 and which slidably engages a vertical, downwardly open, slot 25 of a plate 26 which is located on the underside of front cover 13. Pin 24 and slot 25 permit the height of the forward cover 13 to be adjusted relative to slider 21, consequently permitting a relative balancing in height between the path of front slider 21 and the path of the cover guidance element, further described below. Slider 21 is drivably coupled with a conventional incompressible drive cable 27 that is guided in an upper cable guide 28 of guide rail 18 (FIG. 5).

Figure 7:
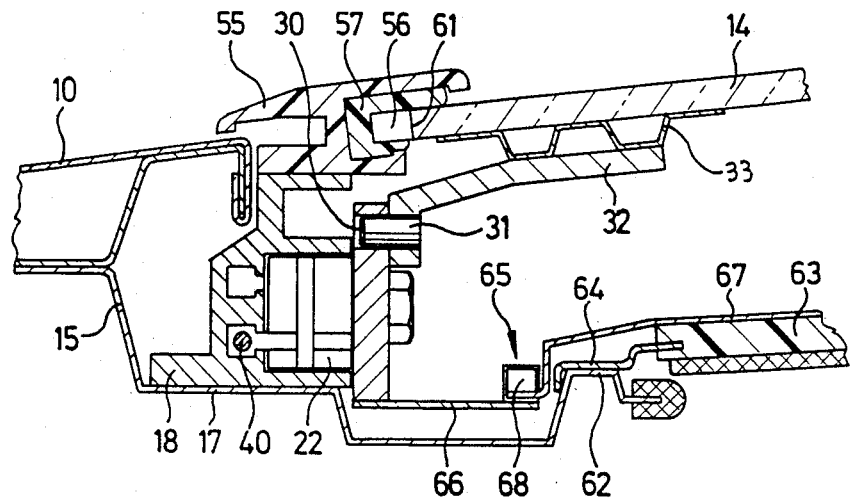
FIG. 7 is a sectional view taken along line VII—VII of FIG. 2.

Middle slider 22 is part of a retaining bracket assembly designated, as a whole, with reference numeral 29 and has a slot 30 which is inclined forwardly and downwardly. A pin 31 is movable in slot 30. Pin 31 is attached to a plate 32 secured to an inner panel 33 near the front edge 34 of the rear cover 14 (FIG. 7).

The rear slider 23 is provided with a guide track 35 which is sloped downwardly towards the front. A guide pin 36 attached to a plate 37 (FIG. 8) interacts with guide track 35. Plate 37 is disposed on an inner panel 33 of the cover in the rear region of cover 14. Guide pin 36 also engages an upwardly open slot 38 of an angle piece 39 that is connected with the guide rail 18. Slot 38 is slightly inclined downwardly and forwardly, as can b seen from FIGS. 2, 3 and 4.

Both of sliders 22 and 23 are drivably coupled with an incompressible drive cable 40. Drive cable 40 is guided, in the longitudinal direction of the roof, in a lower cable guide channel 41 of guide rail 18. Cable guide channel 41, in the same manner as the cable guide channel 28, opens into the guide channel 20 at its laterally outer side. A leaf spring 42 is connected between the rear wall of roof frame 15 and a rear edge area of cover 14, so as to exert an upward biasing action on cover 14 from below.

An inner cover panel 43 is mounted to the underside of front cover 13. A pin 44 pivotally supports a roller 45 and is affixed to inner cover panel 43 near the rear edge of front cover 13. Inner cover panel 43 also carries a gasket 46 that extends along the forward edge of cover 13 for sealing against the fixed roof surface 10 at the front edge 47 of roof aperture 12. Gaskets 48, 50 extend along forward edge 34 and rear edge 49 of rear cover 14. Gasket 48 serves to seal the edge gap between covers 13 and 14, while gasket 50 seals against the fixed roof surface 10 at the rear edge 51 of roof aperture 12. At the inner cover panel 33 of rear cover 14, a water gutter 52 projects forwardly from the front edge 34 of cover 14, below front cover 13. Gutter 52 has a gasket 53 with a resiliently deflectable gasket flap 54 on its forward edge.

Figure 6:
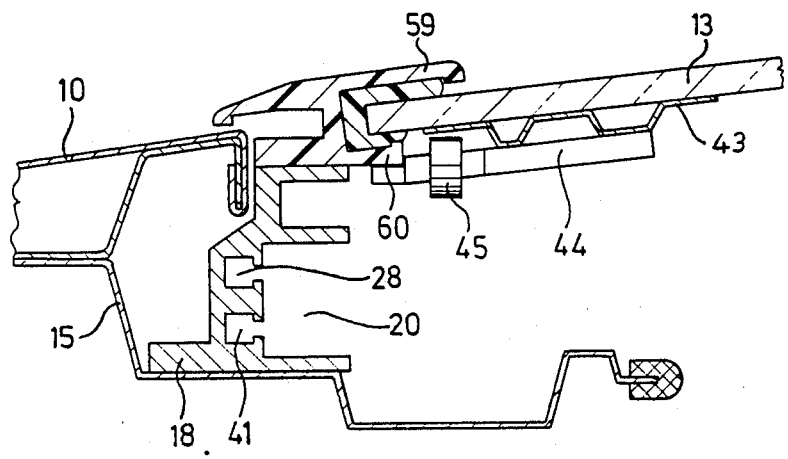
FIG. 6 is a sectional view taken along line VI—VI FIG. 3.
Figure 8:
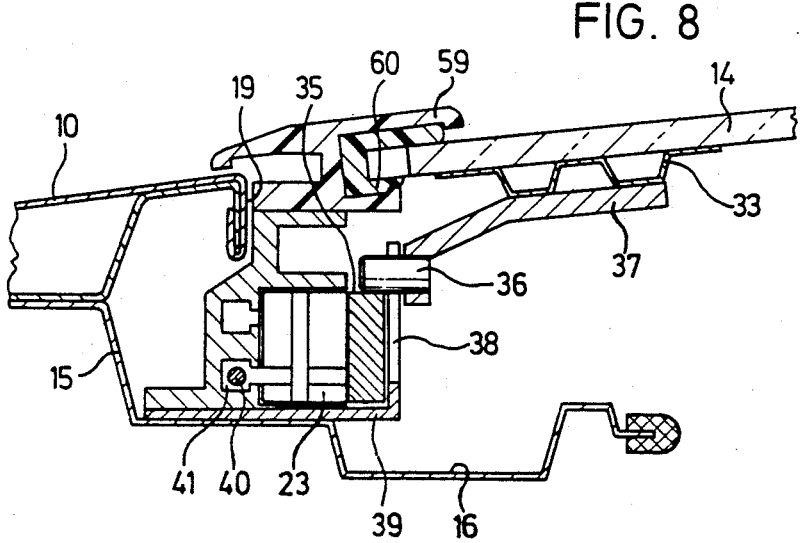
FIG. 8 is a sectional view taken along line VIII—VIII of FIG. 2.

Above lower guide rail 18, there is an upper guide rail 55 that extends along the lateral side edge 19 of roof aperture 12. Guide rail 55 has a guide channel 56 that is lined wit a gasket 57 which extends in the longitudinal direction. Side edge 58 of front cover 13 engages guide channel 56 and is longitudinally displaceably guided therein. Guide channel 56 is defined by an upper arm 59 and a lower arm 60, arm 59 being longer than arm 60 in a transverse direction, as can be seen in FIGS. 5 and 6. Rear cover 14 is narrower than front cover 13 by such an amount that, of the two arms 59, 60 of guide rail 55, only upper arm 59 laterally overlaps side edge 61 of rear cover 14 (FIGS. 7 and 8). Leg 59 and the part of gasket 57 adjacent thereto guide rear cover 14 and restrict its upward movement. However, cover 14 can be lowered past lower arm 60.

Figure 9:
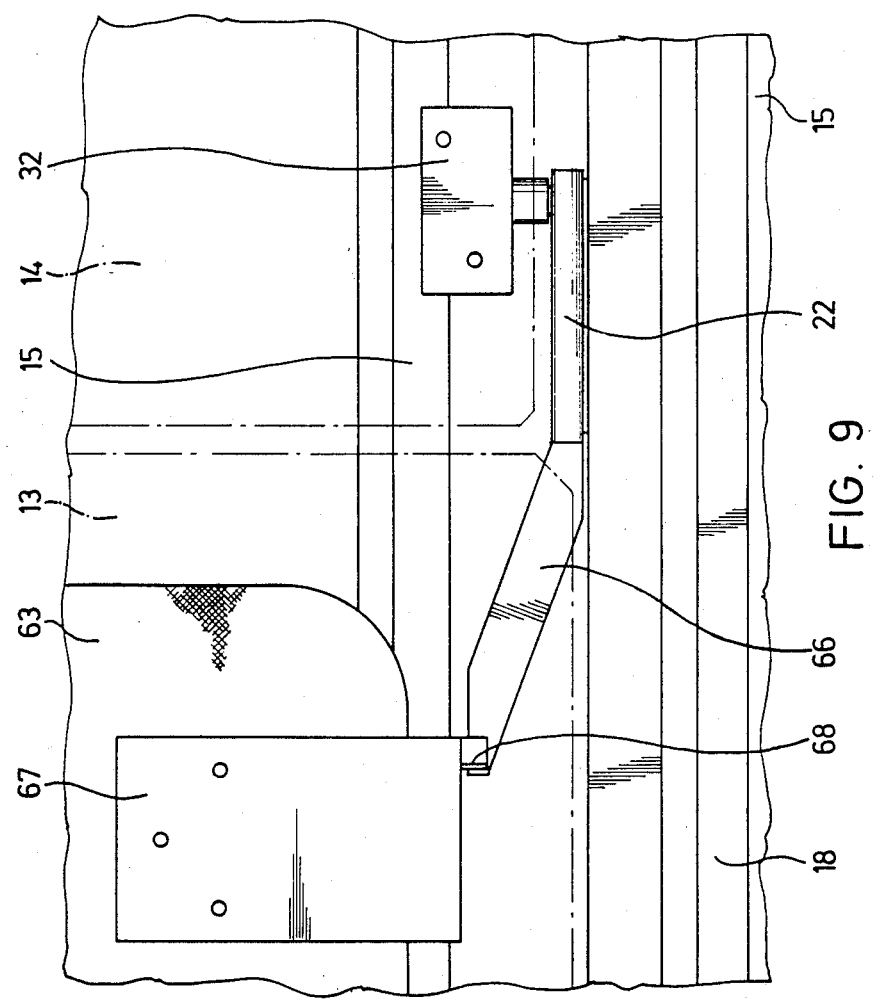
FIG. 9 is a partial top view of the roof, in enlarged scale, with the cover eliminated.

A sliding liner 63 is movably supported by sliders 64 for displacement in the longitudinal vehicle direction on a ridge 62 of roof frame 15 which laterally inwardly defines water gutter 16 (FIG. 7). Sliding liner 63 is coupled with slider 22 via a one-way abutment linkage arrangement 65. Linkage arrangement 65 has a take-along catch 66 affixed to slider 22 so as to extend forwardly from the front thereof. A strap 67 is attached to the sliding liner 63 and is provided with an abutment lug 68 that is located in the path of displacement of take-along catch 66. In the closed position of the roof, the take-along catch 66 rests against the front of the abutment lug 68 (FIG. 9). Covers 13 and 14 are indicated only by dash-dotted lines in FIG. 9.

An individual drive motor can be provided for driving, respectively, the et of drive cables 27 for sliders 21, located on both lateral sides of the roof opening, and for the set of drive cables 40 for sliders 22 and 23 on one roof side and the corresponding sliders on the other roof side (compare German Offenlegungsschrift 35 32 111). Preferably, however, the drive of the two sets of drive cables is executed via a common primary drive 69, downstream of which there is a distributor gear 70. The two component units 69, 70 are only schematically indicated in FIG. 1. In particular, the primary drive can be a hand crank or an electric motor. The distributor gear 70, appropriately, can be designed in a manner is disclosed in German Offenlegungsschrift 35 45 869 and corresponding U.S. Pat. No. 4,649,140.

For the purpose of describing the operation of the depicted vehicle roof, it is assumed that the two covers 13. 14, initially, are in the closed, FIG. 2, position. If, starting from this position, with the drive cable 27 being retained, drive cable 40 is actuated such that sliders 22 and 23 are jointly displaced rearwardly, causing the retaining bracket pin 31 to travel downwardly along retaining bracket slot 30 of slider 22. As a result, the front of rear cover 14 is pulled downwardly into the venting, FIG. 3, position in which the front edge 34 of rear cover 14 is lowered, relative to rear edge 71 of front cover 13 by pivoting about an axis located near its rear edge. Guide track 35 of slider 23 allows guide pin 36 to move downwardly. The engagement between the guide pin 36 and slot 38 of angle piece 39 prevents cover 14 from executing uncontrolled forward movements while in an intermediate position between the closed position (FIG. 2) and the venting position (FIG. 3). Spring 42 prevents a lowering of rear edge 49 of cover 14 in the venting (FIG. 3) position, as well as in the intermediate stages between the venting and closed positions.

As can be seen from FIGS. 2 and 3, water gutter 52, in both the closed and venting positions, as well as in the intermediate stage between these two positions, underlies the rear edge 71 of front cover 13. When lowering the front edge 34 of the rear cover 14, the flexible sealing lip 54 of gasket 53, at the front edge of water gutter 52, automatically turns upward, thereby providing a dependable means for preventing wash or rain water, which, for instance, may be on cover 14, from reaching the interior of the vehicle during the tilting movement of cover 14.

During the pivoting movement of rear cover 14 from the closed, FIG. 2, position into the venting, FIG. 3, position, slider 22, as it travels rearwardly, automatically takes along sliding liner 63 via take-along catch 66, cooperating with lug 68. As a result a venting gap 72 (FIG. 3) is exposed in the front region of roof aperture 12. It is to be understood that the sliding liner 63 can be manually moved further back from the partially retracted FIG. 3 position, if desired, even though it cannot be closed until the cover 14 is closed. In a corresponding manner, the sliding liner 63 can be manually actuated, with the roof closed, in order to control the degree of incoming light and visibility through front cover 13.

When the drive cable 40 is at rest in the venting position, in which the link pin 31 has reached the forward lower end of retaining slot 30, and drive cable 27 is moved rearwardly, slider 21 is moved rearwardly, along guide rail 18. Front cover 13 is taken along with slider 21 via pin 24 and plate 26. In an intermediate position between the venting position and the open position depicted in FIG. 4, rollers 45 engage against the lateral edge area of rear cover 14, so that further rearward movement of front cover 13 causes rollers 45 to push rear cover 14 downwardly against the biasing force of spring 42, whereby the slope of slot 38 in angle piece 39 causes cover 14 to be slightly repositioned to the front via the guide pin 36 on plate 37. In this manner, the bearing pressure at gasket 50 in the region of rear edge 49 of cover 14 is reduced. Cover 13 can be displaced rearwardly over cover 14 up to the point where its rear edge 71 reaches the rear edge 51 of roof aperture 12 (open position according to FIG. 4). It is to be understood that during this sequence, cover 13 can be stopped in any desired intermediate position between the closed (FIG. 3) position and the open (FIG. 4) position. Furthermore, as should be apparent from the drawings, movement of cover 13 is solely a translatory movement along the guide rail 18, yet this movement is not limited by the rear cover 14.

During the transition from the open position into the closed position, the above-described sequence of movements occurs in the reverse direction and order. When cover 13 is pulled to the front via drive cable 27, with drive cable 40 at rest, cover 14 is released for an upward movement under the influence of spring 42. The interaction of guide pin 36 and slot 38 in angle piece 39 causes cover 14 to be slightly displaced to the rear, resulting in the recompression of gasket 50. If drive cable 40 is pulled to the front after cover 13 reaches its forward end position, and after drive cable 27 has been deactivated, cover 14, influenced by the interaction between retaining bracket slot 30 and bracket pin 31, is pivoted upwardly at its front edge 34. Additionally, guide pin 36 is pushed upwardly by guide track 35 of slider 23. Cover 14, at its top side, is pressed against gasket 57 in guide channel 56 of upper guide rail 55.

When the rear cover is made of glass, the vehicle roof can be substantially complemented with solar cells which, for instance, serve to provide energy to a ventilator in the vehicle interior when the vehicle is parked. The upper side rails 55 may be part of a guide frame encircling roof aperture 12. In accordance with a simplified version of the invention, the design can be such that it provides for rear cover 14 to be lowered only in the area of its front edge, but not in the area of its rear edge. I this instance, the front cover 13 is stopped in a furthermost rear position, in which its rear edge 71 contacts, or nearly contacts, the upper side of rear cover 14.

While I have shown and described a single embodiment in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

I claim:

1. Vehicle roof having a front cover and a rear cover which, in a closed position of said covers, adjoin each other in a longitudinal direction of the vehicle roof to close an aperture in a fixed roof surface of a vehicle; said vehicle roof further comprising guide means for guiding of said front cover and extending in the longitudinal direction of the vehicle roof at both sides of said aperture; first drive means, which cooperates with said front cover, for causing the front cover to be displaced along said guide means from a forward end position, which constitutes the closed position of the front cover, to a rearward end position in which the front cover is disposed above said rear cover solely via a translatory movement; second drive means, which cooperates with said rear cover, for pivoting the rear cover about an axis disposed in the vicinity of a rear edge of the rear cover between the closed position of the rear cover and a venting position in which a front edge of the rear cover is lowered relative to a rear edge of the front cover while the front cover is in its forward end position; and means for causing, during the translatory movement of the front cover from the forward end position thereof, the rear edge of the rear cover to be lowered, starting from the venting position, in a manner enabling the front cover, in the course of its translatory movement, to be slid into a position over said rear cover.

2. Vehicle roof according to claim 1, wherein said second drive means includes retaining bracket assemblies that are provided for the pivoting of the rear cover, said assemblies comprising a part connected with the rear cover at each of opposite lateral sides of a front area of the rear cover and a part slidably guided along a rail extending in the longitudinal direction of the vehicle.

3. Vehicle roof according to claim 2, wherein the part of each retaining bracket assembly connected with the rear cover is a link pin, and wherein the slidably guided part is a slider having a retaining bracket slot which receives the link pin.

4. Vehicle roof according to claim 3, wherein said means for causing comprises a height adjustment device that acts upon a rear area of the rear cover for shifting the height of the rearward end of the rear cover.

5. Vehicle roof according to claim 4, wherein the height adjustment device has, at each lateral side of the rear cover, an additional slider and a guide pin connected with the rear area of the rear cover, said pin being slidably guided along a guide track of the additional slider.

6. Vehicle roof according to claim 5, wherein means for producing a tandem sliding movement of the slider of each retaining bracket assembly and the slider of the height adjustment device is provided.

7. Vehicle roof according to claim 5, wherein said second drive means also comprises a longitudinal displacement device which forces a limited longitudinal translational movement upon the rear cover during the pivoting thereof.

8. Vehicle roof according to claim 7, wherein the longitudinal displacement device comprises a stationary retaining bracket having a slot which coacts with said guide pin of the height adjustment device.

9. Vehicle roof according to claim 4, wherein the height adjustment device has at least one spring which exerts upward a biasing action upon the rear cover in its rear area.

10. Vehicle roof according to claim 4, wherein at least one bearing element is located in a rearward area of the front cover, said bearing element engaging upon the rear cover and pushing it downwardly during said retraction of the front cover.

11. Vehicle roof according to claim 10, wherein the bearing element is a rotatable roller disposed at the underside of the front cover.

12. Vehicle roof according to claim 2, wherein a coupling is provided by which the front cover is drivably coupled to front sliders that are slidable along guide rails of the guide means.

13. Vehicle roof according to claim 12, wherein the coupling between the front cover and the front sliders is configured in a manner forming a means for permitting a height adjustment to be effected between the front cover and the front sliders.

14. Vehicle roof according to claim 1, wherein said guide means comprises slidably displaceable sliders and guide rails for the sliders, the front and rear covers being coupled to the slidably displaceable sliders; and wherein said first and second drive means comprise drive cables which are connected to the displaceable sliders and are guided in the guide rails.

15. Vehicle roof according to claim 14, wherein the front cover is slidably guided, at each of opposite lateral sides, in a guide channel of a respective guide rail.

16. Vehicle roof according to claim 15, wherein the guide channel is defined by an upper arm and a lower arm, the upper arm being longer in a transverse direction than the lower arm, and wherein the rear cover is narrower than the front cover by an amount enabling only the upper arm of the guide channel to laterally overlap the rear cover.

17. Vehicle roof according to claim 1, wherein a water gutter is provided at the front edge of the rear cover, said water gutter lying under a rear edge of the front cover when it is in its closed position.

18. Vehicle roof according to claim 17, wherein a gasket is provided at a front end of the water gutter, said gasket having a sealing lip which is resiliently deflectable downwardly toward the water gutter in said closed position and which automatically turns upwardly upon lowering the front edge of the rear cover.

19. Vehicle roof according to claim 2, wherein a sliding liner is provided which is displaceable in the longitudinal direction of the vehicle, said liner being coupled with a drive for the rear cover via a one-way linkage arrangement in such a way that during the pivoting movement of the rear cover into the venting position, starting from said closed position, the sliding liner is automatically caused to be rearwardly displaced a predetermined distance.

20. Vehicle roof according to claim 19, wherein said linkage arrangement has, respectively, on each side of the roof opening, a take-along catch connected with the slidably guided part of each of the retaining bracket assemblies and an abutment lug connected to the sliding liner which, in a closed position of the sliding liner, abuts against a rear side of the take-along catch.

* * * * *